United States Patent [19]

Jacobs-Cook

[11] Patent Number: 5,569,856
[45] Date of Patent: Oct. 29, 1996

[54] DIFFERENTIAL PRESSURE TRANSDUCER WHEREIN A BRIDGE CONNECTS TWO PRESSURE DIAPHRAGMS

[75] Inventor: Alan J. Jacobs-Cook, Birmingham, England

[73] Assignee: Lucas Industries public limited company, West Midlands, England

[21] Appl. No.: 291,101

[22] Filed: Aug. 16, 1994

[30] Foreign Application Priority Data

Oct. 16, 1993 [GB] United Kingdom ............... 9321398

[51] Int. Cl.⁶ ............... G01L 11/00; G01L 13/02
[52] U.S. Cl. ............... 73/702; 73/716; 73/705
[58] Field of Search ............... 73/716, 717, 718, 73/719, 720, 721, 702, 705; 338/4; 250/231.19, 205

[56] References Cited

U.S. PATENT DOCUMENTS

| | | | |
|---|---|---|---|
| 4,790,192 | 12/1988 | Knecht et al. | 73/721 |
| 4,813,271 | 3/1989 | Greenwood . | |
| 4,831,304 | 5/1989 | Dorey et al. . | |
| 4,884,450 | 12/1989 | Greenwood et al. . | |
| 5,022,270 | 6/1991 | Rud, Jr. . | |
| 5,029,479 | 7/1991 | Bryan | 73/721 |
| 5,105,665 | 4/1992 | Parsons et al. | 73/705 |
| 5,152,173 | 10/1992 | Willson | 73/705 |
| 5,195,374 | 3/1993 | Parsons et al. | 73/705 |

FOREIGN PATENT DOCUMENTS

| | | |
|---|---|---|
| 63-305700 | 12/1988 | Japan . |
| 0244086 | 3/1987 | United Kingdom . |
| 0266974 | 10/1987 | United Kingdom . |
| 0279515 | 1/1988 | United Kingdom . |
| WO9015975 | 12/1990 | WIPO . |

OTHER PUBLICATIONS

"Micromechanical resonant sensors," Journal A, vol. 32, No. 3 (Oct. 1991), pp. 15–22.

Primary Examiner—Richard Chilcot
Assistant Examiner—William L. Oen
Attorney, Agent, or Firm—Trexler, Bushnell, Giangiorgi & Blackstone, Ltd.

[57] ABSTRACT

A differential pressure transducer is provided in which first and second diaphragms are formed within a block of material, such as monocrystalline silicon. Each diaphragm carries a support for a bridge. The supports are offset from the center of the diaphragms such that deflection of the diaphragms imparts a degree of lateral motion to the respective support. The bridge is held within an evacuated cavity and the resonant frequency of the bridge is a function of the difference in pressure action of the diaphragms.

12 Claims, 1 Drawing Sheet

DIFFERENTIAL PRESSURE TRANSDUCER WHEREIN A BRIDGE CONNECTS TWO PRESSURE DIAPHRAGMS

BACKGROUND

The present invention relates to a differential pressure transducer. WO 8502 677-A discloses a differential pressure sensor in which two diaphragms are formed in a wafer. The diaphragms act against a fluid within a closed common cavity so that the deflections of the diaphragms are a measure of the difference between the pressures acting on the diaphragms. The deflections of the diaphragms are sensed by capacitive sensing.

U.S. Pat. No. 4,790,192 to Knecht issued Dec. 13, 1988 discloses forming a plurality of diaphragms side by side within a monolithic structure. Deflection of the diaphragms is monitored using strain gauges.

Electrical sensing techniques as employed in the above-described arrangements are susceptible to degradation through electrical noise and may not be suitable for use in hazardous environments. Additionally the direct measurement of the deflection of a diaphragm may not provide a high accuracy measurement with good resolution.

It has been found that highly accurate pressure measurements may be obtained by use of a vibrating beam mounted on a sensing diaphragm. However, due to the need to operate a vibrating beam in a substantially evacuated chamber, differential pressure sensing has not been possible with these existing sensors.

SUMMARY

According to the present invention there is provided a differential pressure transducer, comprising first and second diaphragms, a bridge supported at a first position by a first support movable in response to deflection of the first diaphragm and at a second position by a second support movable in response to deflection of the second diaphragm and arranged such that the force acting on the bridge, and consequently the resonant frequency thereof, is a function of the difference in deflection of the first and second diaphragms.

Thus the differential pressure is measured by measuring the resonant frequency of the resonating bridge. Common (shared) pressure causes the diaphragms to deflect by the same amount and does not give rise to a substantial change in the force acting on the bridge.

Preferably the transducer further comprises means for exciting the bridge into oscillation and for detecting oscillation of the bridge.

Preferably the bridge is contained within a substantially evacuated cavity. Thus the motion of the bridge is undamped and high Q values can be obtained, giving rise to good sensitivity and good resolution.

Preferably motion of the bridge is sensed optically. Advantageously the bridge may also be driven optically.

Preferably the transducer further comprises a fibre optic cable or an embedded wave guide positioned for illuminating a reflecting surface of the bridge. The waveguide or optical fibre may be adjacent and facing the bridge. Thus light may be directed towards a surface of the bridge so as to cause local heating and hence thermal expansion of the bridge to drive the bridge into oscillation. The modulated intensity of light reflected from the bridge may be monitored so as to determine the frequency of oscillation of the bridge.

Preferably the first and second supports are attached at regions of the first and second diaphragms, respectively, whose respective gradients along a direction parallel to the longitudinal axis of the bridge vary with the deflection of the respective diaphragms. Thus deflection of one or both diaphragms gives rise to some motion of the respective support along a direction parallel to the longitudinal axis of the bridge, thereby enhancing the sensitivity of the transducer.

Advantageously the gradients of the regions along a direction perpendicular to the longitudinal axis of the bridge and parallel to the surface of the diaphragm do not vary significantly with deflection of the diaphragms. Thus the angle of the reflective surface of the bridge with respect to the optical path is substantially unaffected by the deflection of the diaphragms.

Preferably the sensor is formed of silicon. The sensor may be fabricated by etching monocrystalline silicon with selective boron doping or electromechanical etching. However, other crystalline materials, such as quartz, gallium arsenide or germanium, may be used.

The bridge may be prestressed, this may be achieved by doping the bridge.

At least one further bridge may be provided. The or each further bridge may have its respective supports attached to the diaphragms at dissimilar places to the or each other bridge so as to provide a different pressure-frequency response to the or each other bridge.

The use of a bridge spanning between the diaphragms allows a simple and robust differential pressure sensor to be constructed in which the frequency of oscillation of the bridge is a function of the pressure difference.

BRIEF DESCRIPTION OF THE DRAWINGS

The present invention will further be described, by way of example, with reference to the accompanying drawings, in which.

DESCRIPTION

Figure 1:
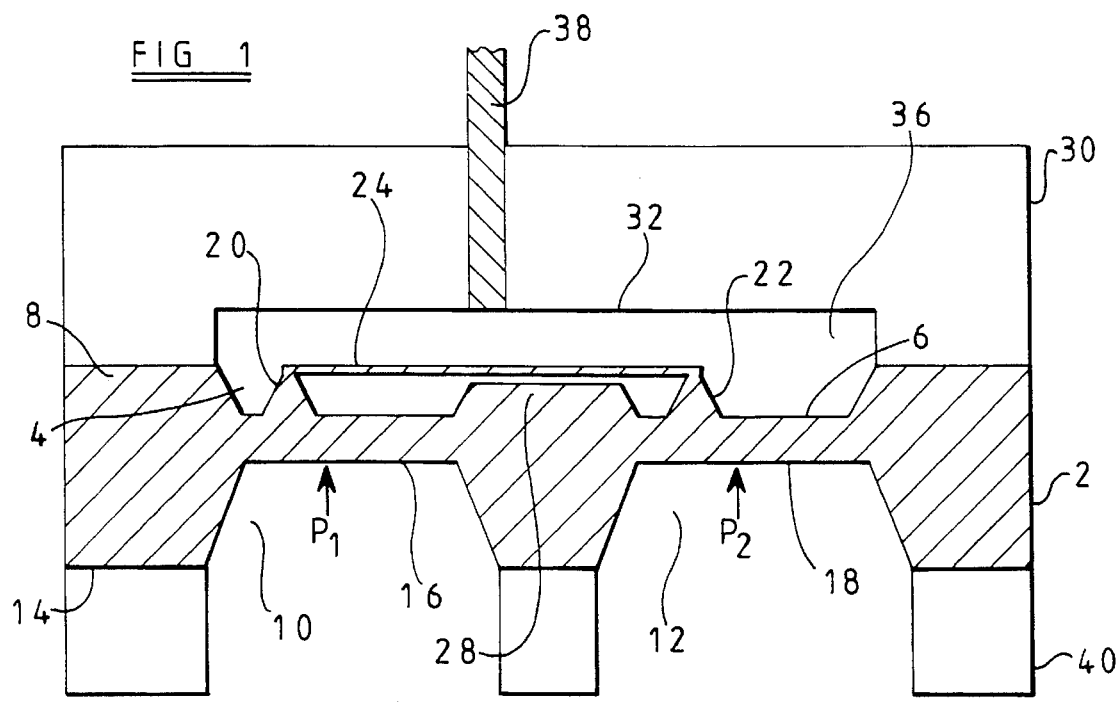
FIG. 1 is a cross section of a differential pressure sensor constituting an embodiment of the present invention.
Figure 2:
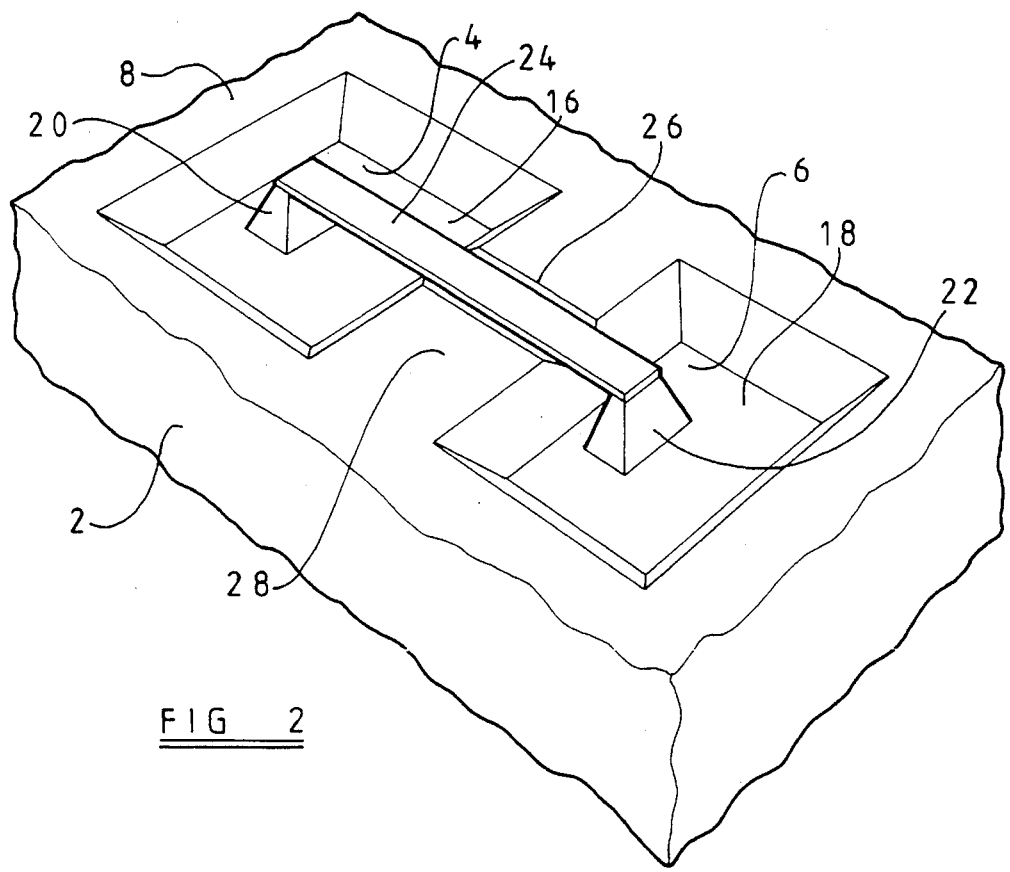
FIG. 2 is a perspective view of the sensor shown in FIG. 1 with the top half thereof removed.

The differential pressure sensor shown in FIGS. 1 and 2 comprises a wafer 2 of silicon etched so as to form first and second wells 4 and 6 in a first surface 8 of the wafer 2, and third and fourth wells 10 and 12, opposing the first and second wells 4 and 6, in a second surface 14 of the wafer 2. The region of the wafer 2 between the first well 4 and the third well 10 forms a first diaphragm 16. The region of the wafer 2 between the second well 6 and the fourth well 12 forms a second diaphragm 18.

First and second supports 20 and 22 extend from the diaphragms 16 and 18, respectively, towards the plane of the first surface 8 of the wafer 2. A bridge 24 extends between, and is supported by, the first and second supports 20 and 22. A groove 26 is formed in the wafer 2 in a region 28 thereof between the first and second wells 4 and 6 so as to allow the bridge 24 to pass from the first well 4, through the groove 26 to the second well 6.

The bridge 24 and the supports 20 and 22 are formed during the etching of the wafer 2 and are integral therewith. The material of the bridge 24 may be doped, for example, with boron so as to prestress the bridge.

A cover 30 of silicon or glass has a well 32 formed therein such that the well 32 cooperates with the first and second wells 4 and 6 to form a chamber 36. The chamber 36 is evacuated so that the bridge 24 may resonate within the chamber 36 without undergoing damping due to viscous drag. An optical fibre 38 extends, in fluid sealed engagement, through a passage in the cover 30. An end of the optical fibre is adjacent and facing the bridge 24 such that light from the fibre 38 illuminates a portion of the bridge 24 and a portion of the light reflected from the bridge 24 is gathered by the optical fibre 38.

Alternatively the fibre 38 may be arranged to illuminate the bridge via a reflector. The cover 30 may be of silicon arranged such that the surface thereof in contact with the wafer 2 is defined by a {110} crystallographic plane. The cover 30 is formed by anisotropic etching such that a groove having walls defined by {111} crystallographic planes is formed for holding the fibre 38. The end of the fibre faces a reflecting surface in a {100} crystallographic plane. Thus the fibre 38 is parallel with the upper surface of the wafer 2 and the reflecting surface is at exactly 45° to the upper surface of the wafer 2. Light from the fibre is reflected onto the bridge via the reflecting surface, and light reflected from the bridge is returned to the fibre 38 via the reflecting surface. Details of such an arrangement are disclosed in EP-A-0 555 968, which is incorporated herein by reference.

The wafer 2 is supported on a stress relieving mount 40. The mount 40 and the surfaces of the wafer 2 and the diaphragms 16 and 18 may be coated so as to protect them from chemical attack by fluids whose pressures are to be measured.

In use, the bridge 24 is driven into oscillation, and its resonant frequency is measured. A suitable apparatus for driving the bridge and measuring the resonant frequency thereof is disclosed in EP 0 381 309 A. A first pressure P1 is applied to the third well 10 and hence to the first diaphragm 16. Similarly a second pressure P2 is applied to the fourth well 12 and hence to the second diaphragm 18. The pressures P1 and P2 cause the first and second diaphragms 16 and 18, respectively, to flex into the chamber 36, i.e. upwards as illustrated in the Figures. The amount by which each of the diaphragms flex is dependent on the pressure applied to that diaphragm. The physical properties of the diaphragms are well matched since they both formed by etching of the same wafer. Thus, when P1 equals P2, the diaphragms 16 and 18 move by the same amount and consequently the stress applied to the resonating bridge 24 is substantially unchanged and hence the resonant frequency thereof remains substantially unchanged.

The supports 20 and 22 may be formed towards an edge of the respective diaphragms 16 and 18, as shown in the Figures. Thus flexing of the diaphragms into the chamber causes the supports to move both upwards and left. Such an arrangement increases the change in stress experienced by the bridge for a given pressure difference between P1 and P2.

If, for example, P1 is less than P2, the second support 22 moves further than the first support 20 and the stress experienced by the bridge 24 alters and this causes the resonant frequency of the bridge to change. Similarly the first support 20 moves further than the second support 22 when P1 is greater than P2. Such an arrangement allows both the pressure difference and a measurement of which is the greater pressure to be made. When P1 is less than P2 the resonant frequency will decrease, whereas when P1 is greater than P2, the resonant frequency will increase.

In a further embodiment, a second bridge may be provided along side the bridge 24. The second bridge may have supports displaced from the supports of the bridge 24, for example towards the right hand side of the diaphragms when the transducer is viewed as in FIG. 1. For identical bridges, the change in resonant frequency for each bridge would be of equal size, but of opposite sign. A single fibre could still be used to illuminate and interrogate both bridges.

The bridges may be arranged to have different resonant frequencies, for example, by making the bridges of different thicknesses. The use of two bridges provides a relatively easy way of providing temperature compensation since any changes in temperature will affect both bridges. The use of two bridges can also provide compensation for other non-linear effects, such as, for example, stressing of the supports. The bridges may have independent drive and sensing systems and have independent optical paths. Alternatively, the bridges may share an optical path since the light for driving the bridges may be simultaneously modulated at two frequencies as each bridge is substantially unresponsive to light modulated at a frequency significantly different to the resonant frequency of that bridge. The resonant frequencies may then be measured and processed to provide an indication of magnitude and sense of the pressure difference.

It is thus possible to provide a simple and robust differential pressure sensor. The use of an optically driven and sensed system allows the sensor to be used in hazardous and/or noisy environments. Furthermore, the use of a resonating sensor allows for a high Q and hence good resolution to be achieved.

The invention claimed is:

1. A differential pressure transducer, comprising first and second diaphragms, first and second supports, and a bridge having a resonant frequency, said bridge being supported at a first position by said first support and at a second position by said second support, said first and second supports being movable in response to deflection of said first and second diaphragms, respectively, such that a force acting on said bridge, and consequently the resonant frequency thereof, is a function of a difference in deflection of said first and second diaphragms.

2. A differential pressure transducer, as claimed in claim 1, further comprising a structure defining a substantially evacuated cavity, said bridge being contained within said substantially evacuated cavity.

3. A differential pressure transducer, as claimed in claim 1, further comprising a device for exciting said bridge into oscillation and a device for detecting a frequency of oscillation of said bridge.

4. A differential pressure transducer as claimed in claim 1, further comprising one of an optical fibre and an embedded waveguide, and in which said bridge has a reflective surface, said one of said optical fibre and embedded waveguide being positioned for illuminating said reflective surface.

5. A differential pressure transducer as claimed in claim 1, in which motion of said bridge is sensed optically.

6. A differential pressure transducer as claimed in claim 1, in which said bridge is driven optically.

7. A differential pressure transducer as claimed in claim 1, in which said bridge has a longitudinal axis and said first and second supports are attached to said first and second diaphragms, respectively, at first and second regions, and in which a gradient of the first region along a direction parallel to said longitudinal axis varies with deflection of said first diaphragm, and a gradient of said second region along a direction parallel with said longitudinal axis varies with deflection of said second diaphragm.

8. A differential pressure transducer as claimed in claim 7, in which deflection of one of said first and second diaphragms gives rise to motion of one of said first and second supports, respectively, parallel to said longitudinal axis.

9. A differential pressure transducer as claimed in claim 8, in which further gradients of said regions along a direction perpendicular to said longitudinal axis and parallel to said diaphragms are substantially unaffected by deflection of said diaphragms.

10. A differential pressure transducer as claimed in claim 1, in which said transducer is formed from at least one of silicon, monocrystalline silicon, quartz, gallium arsenide and germanium.

11. A differential pressure transducer as claimed in claim 1, in which said bridge is prestressed.

12. A differential pressure transducer as claimed in claim 1, further comprising at least one further bridge.

* * * * *